United States Patent
Umberg

(10) Patent No.: US 7,481,410 B2
(45) Date of Patent: Jan. 27, 2009

(54) EQUIPMENT SECURITY APPARATUS

(75) Inventor: John R. Umberg, Diamond Bar, CA (US)

(73) Assignee: Business Machines Security, Inc., Brea, CA (US)

( * ) Notice: Subject to any disclaimer, the term of this patent is extended or adjusted under 35 U.S.C. 154(b) by 6 days.

(21) Appl. No.: 10/465,382

(22) Filed: Jun. 19, 2003

(65) Prior Publication Data

US 2003/0234335 A1  Dec. 25, 2003

Related U.S. Application Data

(60) Provisional application No. 60/391,396, filed on Jun. 24, 2002, provisional application No. 60/415,695, filed on Oct. 2, 2002.

(51) Int. Cl.
*F16M 13/00* (2006.01)

(52) U.S. Cl. .......................... 248/551; 248/552; 70/58; 70/62

(58) Field of Classification Search ................. 248/551, 248/552, 317, 323, 324, 327, 343, 345; 70/58, 70/232, DIG. 57, 62
See application file for complete search history.

(56) References Cited

U.S. PATENT DOCUMENTS

| | | | |
|---|---|---|---|
| 2,215,331 A * | 9/1940 | Marsh | 248/251 |
| 2,486,032 A | 10/1949 | Jimenez | |
| 3,128,979 A | 4/1964 | Damello | |
| 3,664,616 A | 5/1972 | Raskin | |
| 3,724,798 A | 4/1973 | Lucasey | |
| 3,771,338 A | 11/1973 | Raskin | |
| 3,990,276 A | 11/1976 | Shontz | |
| 4,031,721 A | 6/1977 | Anderson | |
| D270,689 S | 9/1983 | Boscacci | |
| 4,613,109 A | 9/1986 | Boscacci | |
| 4,928,914 A | 5/1990 | Snodell | |
| D309,562 S | 7/1990 | Boscacci et al. | |
| 4,946,127 A | 8/1990 | Kulaga | |
| 4,964,606 A | 10/1990 | Beam et al. | |
| D320,928 S | 10/1991 | Boscacci et al. | |
| D322,210 S | 12/1991 | Boscacci et al. | |
| 5,127,617 A | 7/1992 | Bergetz | |
| 5,135,197 A | 8/1992 | Kelley et al. | |

(Continued)

OTHER PUBLICATIONS

Bretford Product brochure pages for TPMA LCD Projector Mount Assembly Instructions Steps 1-7, www.Bretford.com, year 2002-2005.*

(Continued)

*Primary Examiner*—Kimberly T Wood
(74) *Attorney, Agent, or Firm*—Knobbe Martens Olson & Bear LLP

(57) ABSTRACT

A security apparatus connects an electronic device to a structure. The security apparatus includes a structural mount, a security enclosure, and a swivel mechanism. The structural mount extends from the structure. The security enclosure has a tray that can mount a variety of electronic devices externally to the security enclosure. The security enclosure also has a security housing that slidably receives the tray. The tray and the security housing define a substantially secure fastening volume wherein at least one electronic device fastener is located. The swivel mechanism, which is at least partially located within the fastening volume, engages the security housing and orients the security enclosure and the electronic device attached thereto with respect to the structure.

15 Claims, 12 Drawing Sheets

U.S. PATENT DOCUMENTS

| | | |
|---|---|---|
| 5,209,445 A | 5/1993 | Bergetz |
| 5,383,641 A | 1/1995 | Bergetz |
| 5,487,524 A | 1/1996 | Bergetz |
| 5,490,655 A | 2/1996 | Bates |
| 5,551,658 A * | 9/1996 | Dittmer ............... 248/329 |
| 5,775,665 A | 7/1998 | Haskin et al. |
| 5,790,910 A | 8/1998 | Haskin |
| D400,085 S | 10/1998 | Haskin |
| 6,029,580 A | 2/2000 | Alfonso et al. |
| 6,042,068 A | 3/2000 | Tcherny |
| 6,298,695 B1 | 10/2001 | Vezina et al. |
| D478,088 S | 8/2003 | Hamouz |
| 6,606,887 B1 * | 8/2003 | Zimmer et al. ........... 70/164 |
| D480,100 S | 9/2003 | Lam |
| D488,708 S | 4/2004 | Lam et al. |
| D489,599 S | 5/2004 | Lam |
| D491,747 S | 6/2004 | Walters |
| D504,305 S | 4/2005 | Gillespie et al. |
| 6,926,244 B1 | 8/2005 | O'Neill |
| 6,941,469 B2 | 9/2005 | Beuchat et al. |
| D513,470 S | 1/2006 | Gillespie et al. |
| 2004/0084586 A1 | 5/2004 | Gillespie |
| 2004/0164212 A1 | 8/2004 | Gillespie et al. |
| 2005/0139742 A1 * | 6/2005 | Frisell ............... 248/317 |

OTHER PUBLICATIONS

Bretford Product brochure, LCD Projector mounts, year 2002-2005.*

Vector Pro™ Projector Mount, Technical Data Sheet, Peerless Industries, Inc., Jul. 19, 2001, Sheet No. 055-9501-4.

Aztec Security Products product brochure (Aug. 27, 2001).

Peerless Industries product brochure.

Lucasey Mounting Systems product brochure (2002).

Premier Mounts product brouchure.

Bretford product brochure.

*Drawings* for "Mitsubishi LCD Loc" related to product shipped more than a year before the Jun. 24, 2001 priority date of the present application in 8 pages: dates redacted.

*Installation Instructions*—LCD Loc for a product shipped more than a year before the Jun. 24, 2001 priority date of the present application in 1 page; dates redacted.

*8×10 Photographs* of a product shipped more than a year before the Jun. 24, 2001 priority date of the present application in 4 pages.

* cited by examiner

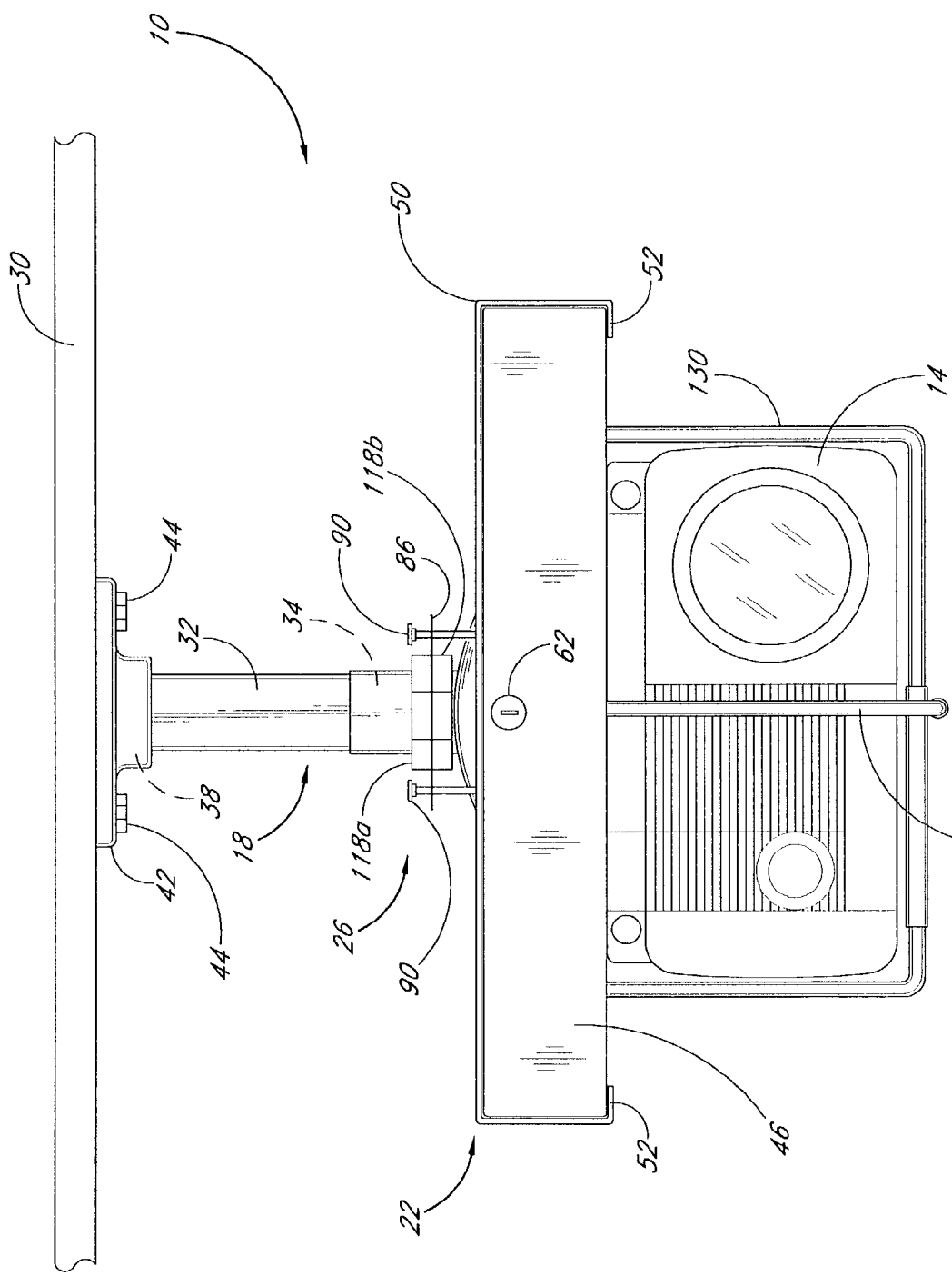

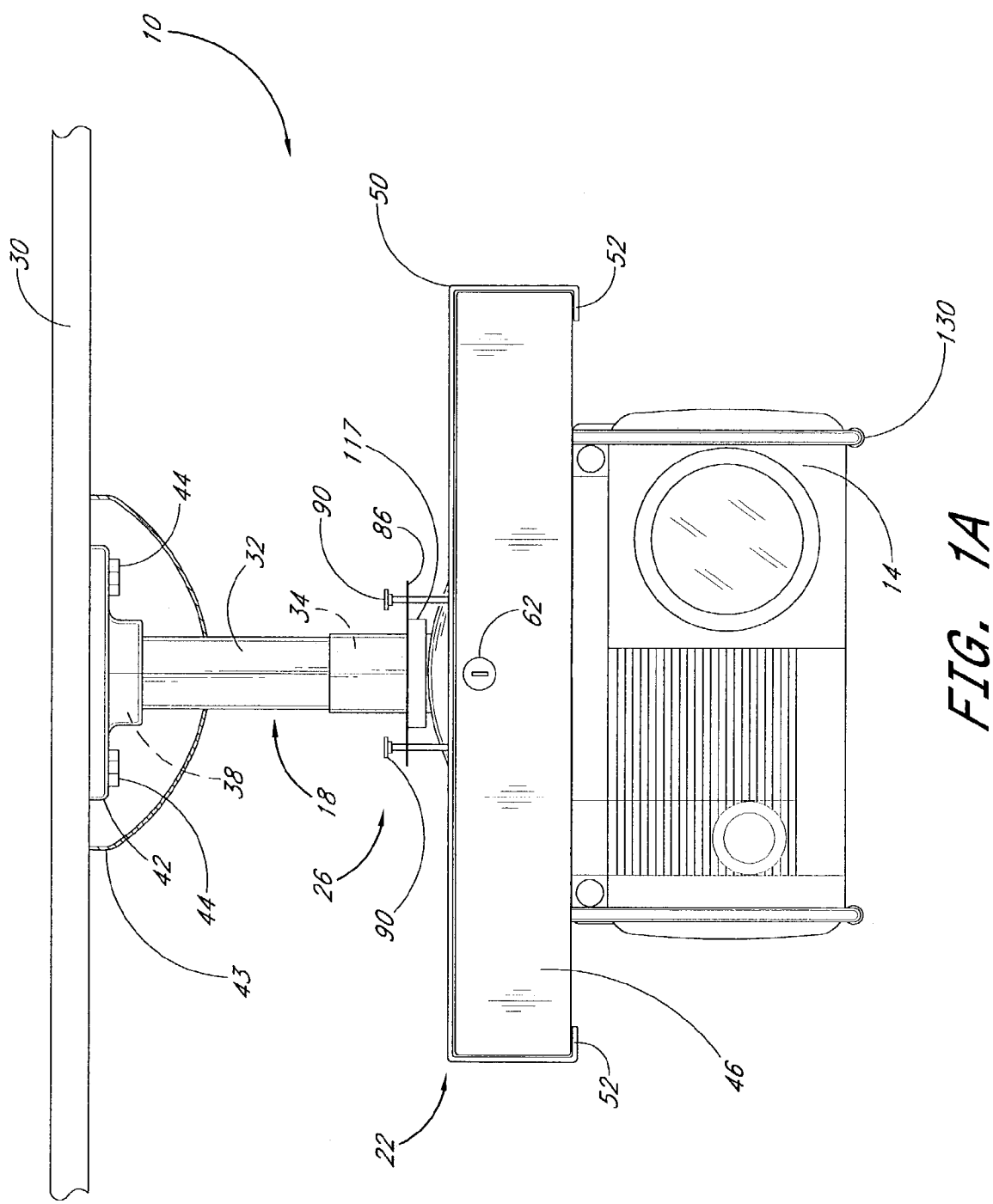

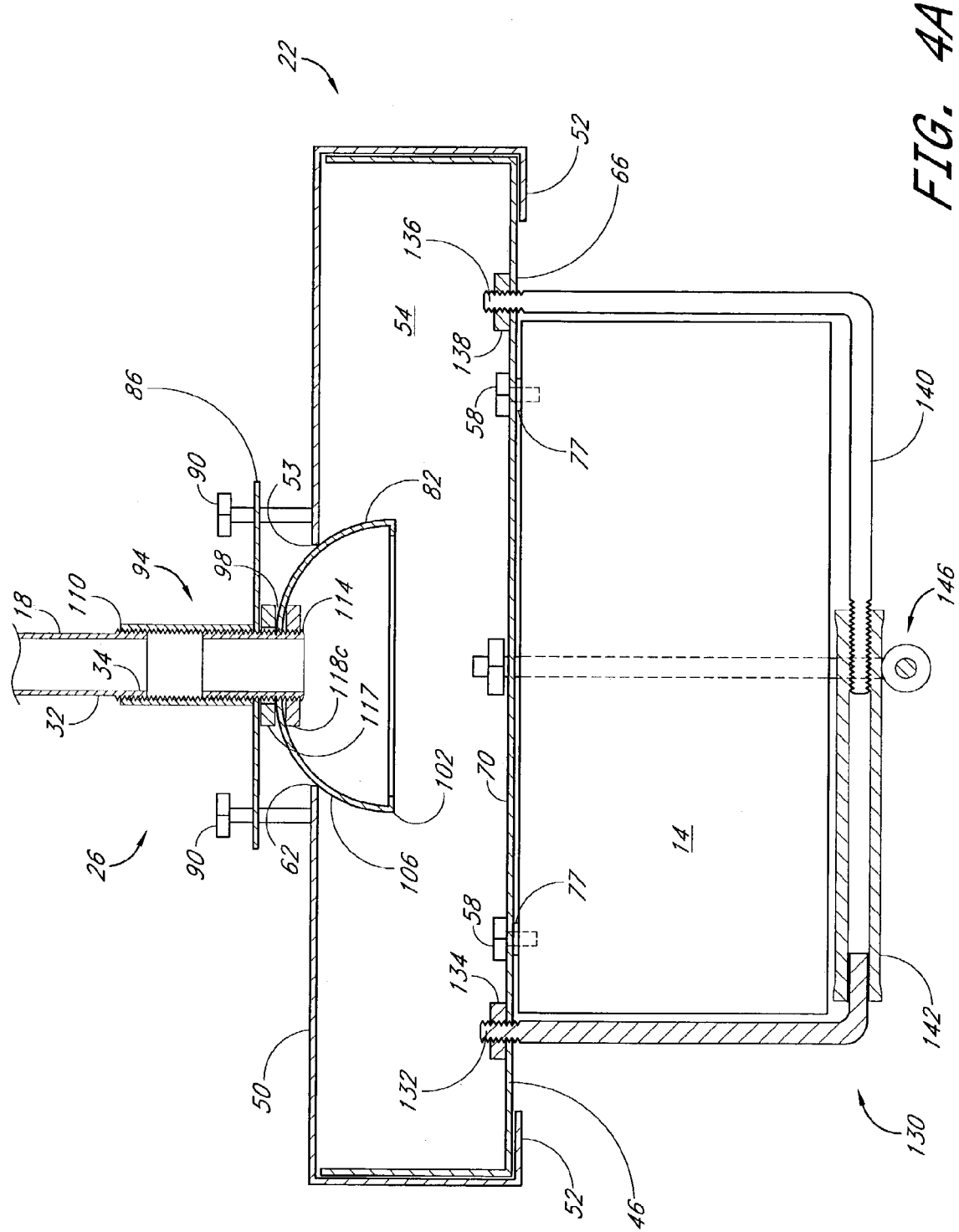

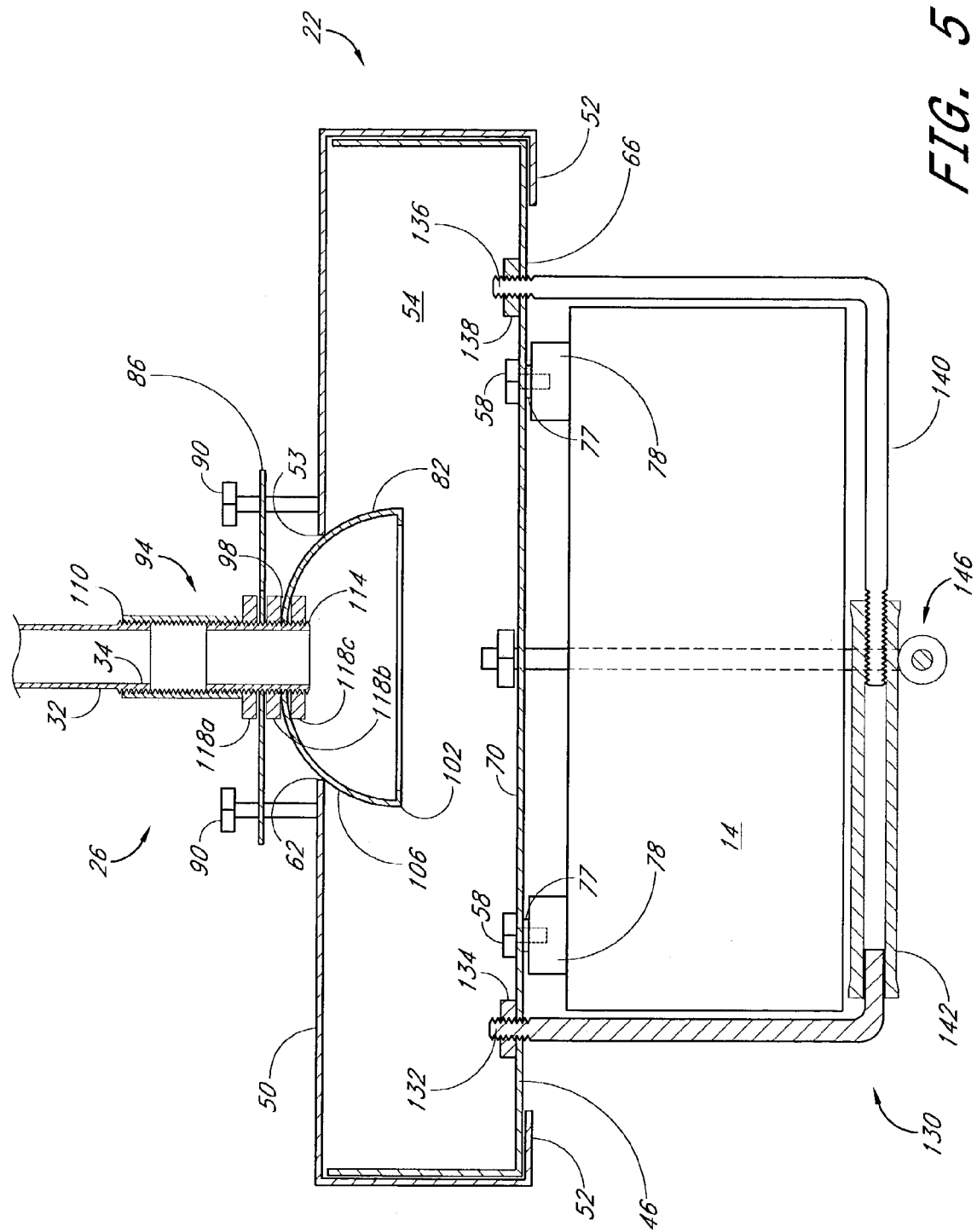

EQUIPMENT SECURITY APPARATUS

RELATED APPLICATION

This application claims the benefit of U.S. Provisional Application No. 60/391,396, filed Jun. 24, 2002 and U.S. Provisional Application No. 60/415,695, filed Oct. 2, 2002, the contents of both of which are hereby expressly incorporated by reference herein.

BACKGROUND OF THE INVENTION

1. Field of the Invention

The present invention generally relates to an apparatus for mounting equipment in a public building or the like, and, more particularly, to an equipment security apparatus for securing equipment from theft.

2. Description of the Related Art

Electronic devices, such as projectors, are often used in public buildings for communicating information to the building's users. Such electronic devices typically include a power cord, control buttons and signal input/output connections, which are usually located around the outside surface of the devices. The control buttons control the performance and other aspects of the devices, while the power cord and signal input/output connections provide for interconnection of the devices with a source of power, a signal source, and with other electronic devices. Being valuable and relatively portable, such devices are often a target for theft. Accordingly, equipment owners wish to secure these electronic devices from theft.

Over the years, a variety of mounting devices have been developed to mount and secure electronic devices. One commercially available mounting device provides a cage into which a projector can be placed. The cage has a small opening on one side through which the images from the projector are projected. The cage, however, tends to unduly limit access to the various control buttons and signal input/output connections located on the projector's outside surface. In addition, the cage tends to reduce the ability of the projector to eliminate the heat generated during operation of the projector. The size of the cage also limits the size of the projector that can be secured.

Another commercially available mounting device includes a base unit that connects the projector to a ceiling or other surface. The base unit employs a mounting adapter secured by screws to the various internally threaded mounting holes on the projector. The base unit is also capable of independent pitch, roll, and yaw adjustments. These adjustments are made by loosening several mechanical fasteners, repositioning the base unit, and then tightening the fasteners. This base unit style mounting device is not convenient for several reasons. For example, due to the wide variety of electronic devices used and the numerous manufacturers thereof, the location of the mounting holes of each projector is different from one projector to the next. This requires the production of a multitude of different mounting adapters to fit the hole pattern of each different projector. In addition, the separate adjustment of pitch, roll, and yaw is tedious and difficult because the projector must be held in place while many fasteners are tightened. As a result, the pitch, roll, and yaw adjustment of the projector usually requires two people.

Other mounting devices that are commercially available employ simple mechanical fasteners that connect the electronic device to the mounting apparatus. These fasteners deter theft to some degree because they are designed to be removed only by special tools. However, because these fasteners are accessible to a would-be thief, they still can be removed relatively easily by an experienced thief.

Accordingly, there is a need for an equipment security apparatus that provides greater security for equipment, such as an electronic device, without severely limiting access thereto, and which allows the user to easily orient the equipment. In addition, there is a need for an equipment security apparatus that is versatile in that it can be used with many different types of equipment and different electronic devices without requiring different mounting adapters. The present invention satisfies these and other needs and provides further related advantages.

SUMMARY OF THE INVENTION

The present invention is embodied in a security apparatus that connects an electronic device to a structure. In one embodiment, the security apparatus comprises a structural mount, a security enclosure, and a swivel mechanism. The structural mount is configured to extend from the structure. The security enclosure has a tray that is configured to engage a variety of electronic devices externally to the security enclosure. The security enclosure also has a security housing that slidably receives the tray. The tray and the security housing together define a fastening volume wherein at least one electronic device fastener is located for securing the electronic device to the tray. The swivel mechanism is at least partially located within the fastening volume. The swivel mechanism is configured to engage the security housing and to orient the security enclosure and the electronic device attached thereto with respect to the structure.

In another embodiment, the security apparatus comprises a tray, a security housing, a fastening volume, and a lock. The tray has an equipment mounting surface, a fastening volume surface, and a plurality of attachment holes that extend from the equipment mounting surface to the fastening volume surface. The attachment holes receive fasteners sized to engage the device. The security housing has a hole that receives a swivel mechanism that orients the security housing with respect to the structure. The security housing slidably receives the tray. The fastening volume is at least partially defined by the security housing and the fastening volume surface of the tray. The lock selectively connects the tray to the security housing.

In another embodiment, the security apparatus comprises a column, a security enclosure, a swivel mechanism, and at least one security bar. The column extends from a structure. The security enclosure defines a fastening volume wherein an electronic device can be fastened externally to the security enclosure. The security enclosure has a security housing, a tray, and a lock. The security housing has an opening. The tray, which is slidably received by the security housing, has a hole pattern grid. The lock selectively connects the tray to the security housing. The swivel mechanism is connected to the column and is at least partially located within the fastening volume. The swivel mechanism orients the security enclosure and the device attached thereto. The security bar at least partially surrounds the device, extends through the hole pattern grid, and is connected to the security enclosure in the fastening volume.

In another embodiment, the security apparatus comprises a structural mount configured to extend from a structure, a security enclosure, and a ball joint. The security enclosure includes a tray that is configured to engage an electronic device externally to the security enclosure and a security housing. The security housing is coupled with the tray. The tray and the security housing define a substantially secure fastening volume wherein at least one fastener for attaching an electronic device to the security enclosure is located. The ball joint is also at least partially located within the fastening volume.

As summarized above, and as discussed more fully below, the present invention provides several advantages. For example, the fastening volume, in which the fasteners that connect the electronic device to the tray and the fasteners that connect the swivel mechanism to the column, is not accessible. This greatly enhances the security of the apparatus because a thief is unable to tamper with the fasteners without first defeating the lock. Another advantage of the present invention is that, while the fasteners are inaccessible to a thief, the electronic device is substantially accessible to the user. This accessibility makes the electronic device easier to operate compared to other systems that mostly or completely enclose the electronic device. Another advantage of the present invention is that a wide variety of electronic devices, e.g., devices of differing sizes, devices having different mounting hardware placement, etc., can be used without requiring a wide range of adapter configurations. Another advantage is provided by the swivel mechanism which allows orientation of the electronic device, while having a relatively simple design. This simple swivel mechanism design is easily adjusted and thus the electronic device can be oriented by a one person.

Other features and advantages of the present invention will become apparent from the following detailed description of the preferred embodiments, taken in conjunction with the accompanying drawings, which illustrate, by way of example, the principles of the invention.

BRIEF DESCRIPTION OF THE DRAWINGS

The accompanying drawings are included to provide a further understanding of the present invention and are incorporated in and constitute a part of this specification. The drawings illustrate embodiments of the present invention and together with the description serve to explain the principles of the invention.

FIG. 1 is a front elevation view of one embodiment of a security apparatus that securely connects a projector to a structure.

FIG. 1A is a front elevation view, partially in cross-section, of one variation of the security apparatus of FIG. 1.

FIG. 4A is a cross-section elevation view of the security apparatus of FIG. 2A, taken substantially along section plane 4A-4A.

FIG. 5 is a cross-sectional elevation view, similar to FIG. 4, showing the projector mounted on the security enclosure with one embodiment of flexible footings.

DETAILED DESCRIPTION OF THE PREFERRED EMBODIMENTS

Figure 2:
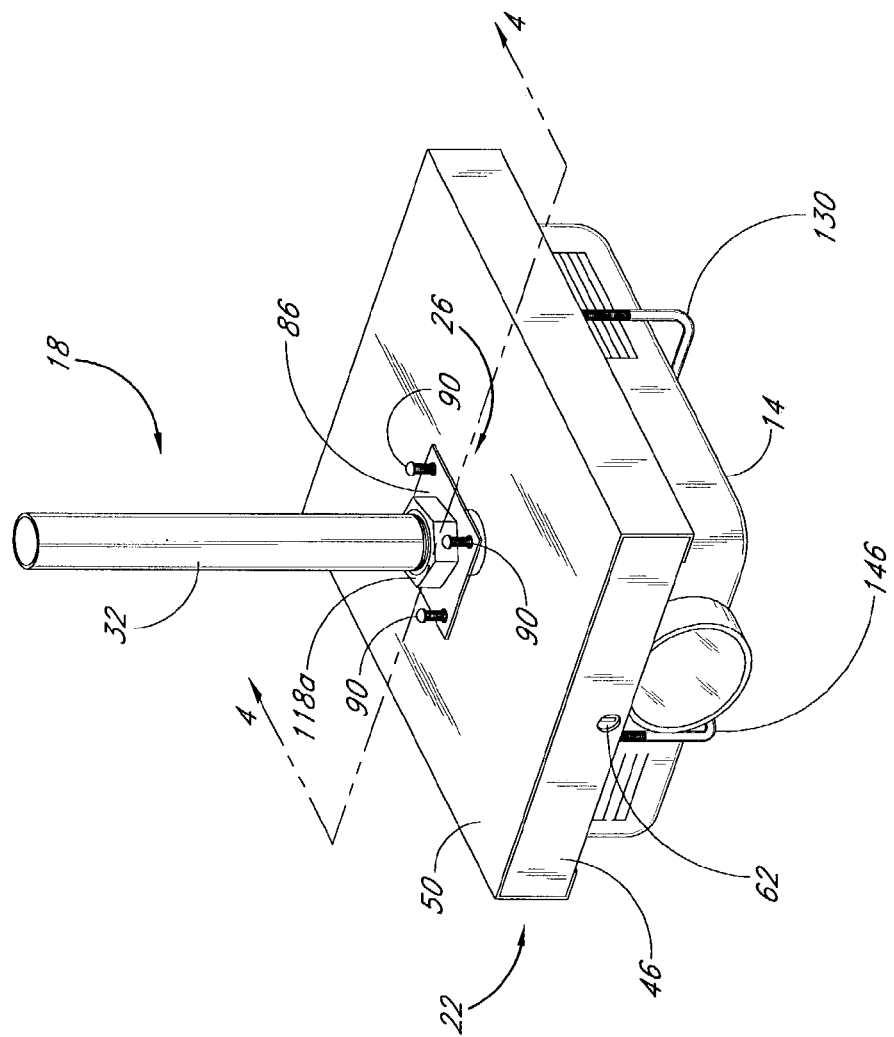
FIG. 2 is a perspective view of the security apparatus of FIG. 1.

FIG. 1 is a front elevation view of a security apparatus 10 for securing a liquid crystal display (LCD) projector 14 against theft. The security apparatus 10 includes a structural mount 18, a security enclosure 22, and a swivel mechanism 26. The security enclosure 22 engages the projector 14 in a manner that protects the projector 14 from theft, as discussed more fully below. The security enclosure 22 also engages the swivel mechanism 26, which adjusts the orientation of the projector 14 with respect to a structure 30 or to a projection surface, such as a projection screen. The configuration and operation of the swivel mechanism 26 is discussed in more detail below in connection with FIGS. 4-7. The structural mount 18 is connected to the swivel mechanism 26 and is also connected to the structure 30. The structure 30 may broadly be any structure that is substantially larger than the projector 14. For example, as discussed in more detail below, the structure may be, without limitation, a structure found in a building, such as a ceiling, an inside wall, an outside wall, a floor, or a roof of a building, a heavy piece of furniture, e.g., a desk, a stand, a cart, a shelf or other similar structure. The structure 30 may also include a structure found in a vehicle, such as a wall or ceiling of a vehicle.

In one application, the security apparatus 10 is mountable to a ceiling that partially defines an inside room of a building. The security apparatus 10 could also be mounted on an inside wall, an outside wall, a floor, or a roof of a building (e.g., the security apparatus 10 could secure an outdoor projection system, one or more components of an outdoor sound system, or any other relatively valuable and relatively portable device to a building roof). In another embodiment, the security apparatus 10 could be mounted on a heavy piece of furniture or to any other structure 30 that is relatively incapable of being stolen.

Although the figures described herein show an LCD projector, the security apparatus 10 could be used in connection with other electronic devices or other types of equipment to be secured against theft. The device to be secured is mounted generally externally to the security enclosure 22, and thus the security apparatus 10 is particularly useful for devices that have controls located on the outside surface of the device, for devices that require occasional adjustments, or for devices that must be connected to other devices via input/output connections located on the device's outside surface. However, the security enclosure 22 could be used more generally to protect any type of portable equipment from theft.

The structural mount 18 preferably includes an elongate element 32 that has a first end 34 and a second end 38. The first end 34 is configured to engage the swivel mechanism 26 in a suitable manner. In one embodiment, the first end 34 has external threads that engage internal threads located on a component of the swivel mechanism 26. In another embodiment, the structural mount 18 and the swivel mechanism 26 could be made with a unitary construction. However, if the structural mount 18 and the swivel mechanism 26 can be disengaged, as with mating threads, the security apparatus 10 can be more easily adapted for different environments. For example, by providing elongate elements 32 of different lengths, the security apparatus 10 can be used in a wide variety of environments, e.g., ceilings of different heights or structures 30 of varying sizes.

In one embodiment, the elongate element 32 is a column. If the elongate element 32 is a column, it can be configured as a hollow tube, a solid rod, or any other shape or configuration suitable to connect the swivel mechanism 26 to the structure 30. Preferably, the elongate element 32 is a steel tube that has an outer diameter of about two inches and a length of about eighteen inches. With this construction, the elongate element 32 provides a hidden path for a power cord and other cable connections to the projector 14.

The second end 38 of the elongate element 32 is configured to engage the structure 30. In one embodiment, the second end 38 is provided with external threads (not shown) that engage internal threads (not shown) of a flange 42 attached to the structure 30. The flange 42 can be attached to the structure 30 in any suitable way. For example, the flange 42 could be attached by a plurality of lag bolts 44, e.g., by four lag bolts 44, each of the lag bolts 44 having a five-sixteenths inch diameter and a three and one-half inch length. In another embodiment, the structural mount 18 could extend from a load bearing component of the structure 30. The structural mount 18 could also be formed as an integral part of the structure 30. While the embodiment of the security apparatus 10 shown includes the structural mount 18 and the flange 42, these elements are not required in all embodiments. Some embodiments also include a shroud 43 (see FIG. 1A) which can be provided to limit access to and/or hide some or all of the flange 42 and the elongate element 32.

Although it is preferred that the structural mount 18 of the security apparatus 10 be relatively easily attached to the swivel mechanism 26 and to the structure 30, it should be assembled such that it cannot be easily detached therefrom. A preferred approach to securely attach the security apparatus 10 to the structure 30 involves applying an adhesive to the elongate element 32, to the flange 42, or to both the elongate element 32 and the flange 42 prior to attaching these two components together. One adhesive that can be used is commercially available under the name LocTite 271, and is available from Loc-Tite®, or the adhesive EP-400 which is available from Rector Seal. One skilled in the art will appreciate that there are other ways to attach the security apparatus to the structure 30 securely within the scope of the subject matter disclosed herein, e.g., welding, gluing, and clamping.

Figure 3:
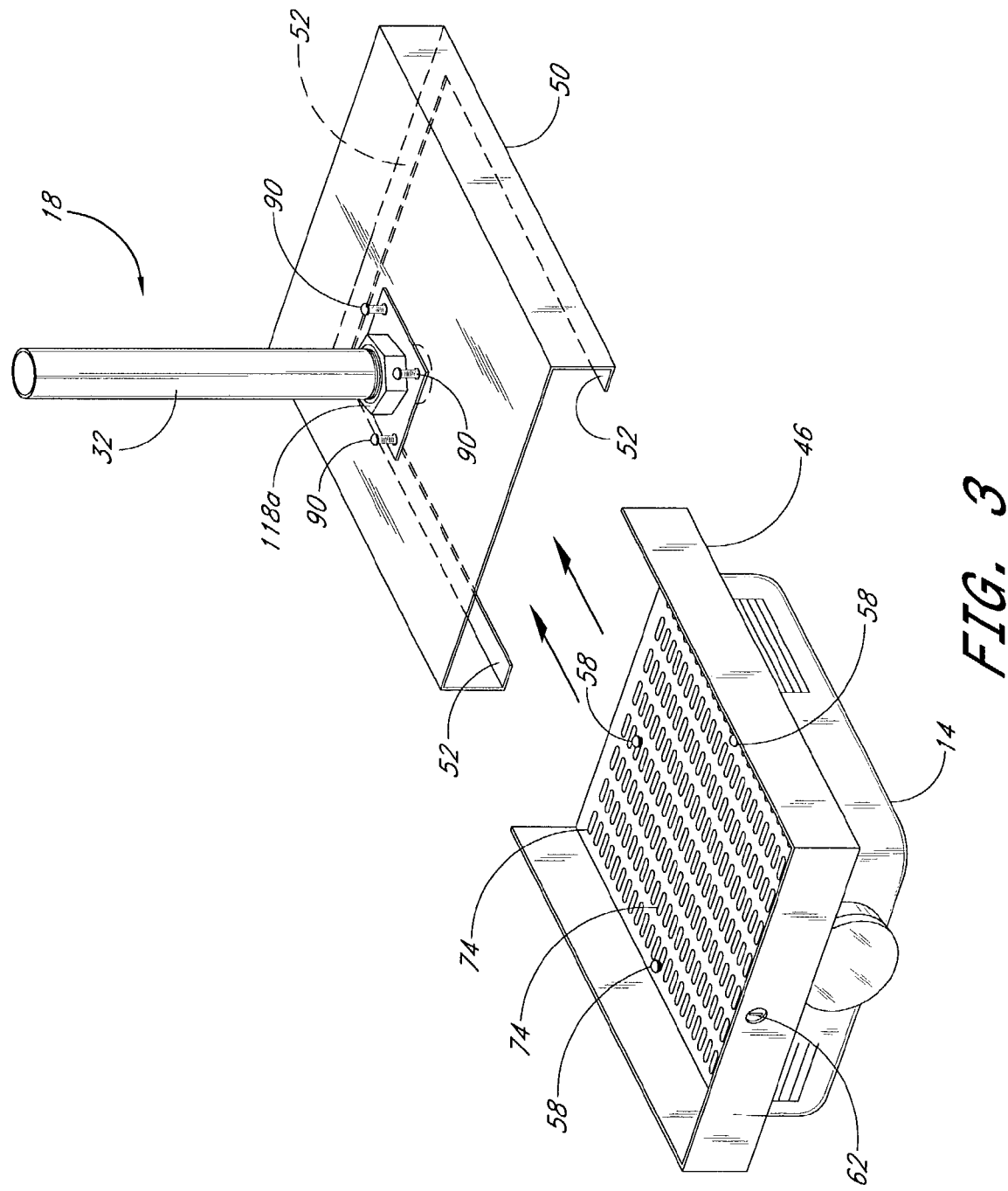
FIG. 3 is a perspective view of the security apparatus of FIG. 2, showing a portion of a security enclosure removed therefrom.

The security enclosure 22 preferably has a security tray 46 and a security housing 50 that is coupled with the security tray 46. FIG. 3 shows the tray 46 slidably received by the security housing 50. In one embodiment, sliding engagement of the security tray 46 with the security housing 50 is achieved by providing three underhanging flanges 52 arranged along three contiguous sides of the bottom of the security housing 50. The fourth side of the bottom of the security housing 50 that does not have an underhanging flange 52 is the side into which the tray 46 is inserted. The underhanging flanges 52 engage and support a portion of the bottom surface of the security tray 46 and thereby provide sliding engagement of the security tray 46 relative to the security housing 50. In another embodiment, the security housing 50 could be provided with two underhanging flanges 52 on opposite lateral sides of the security housing 50 or could be provided with a single underhanging flange 52 that extends from one lateral side of the security housing 50 to an opposite lateral side thereof.

Figure 4:
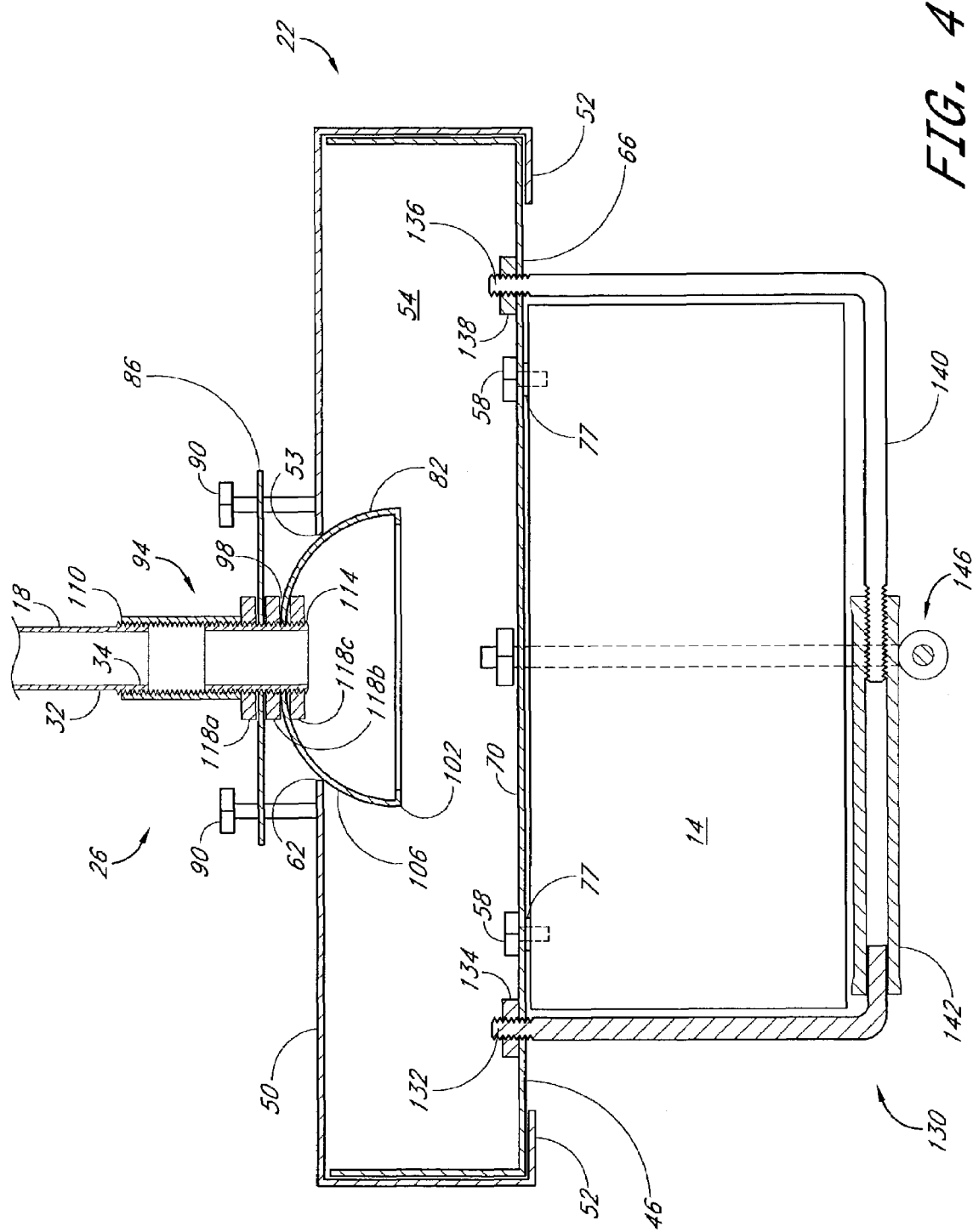
FIG. 4 is a cross-section elevation view of the security apparatus of FIG. 2, taken substantially along section plane 4-4, showing one embodiment of a swivel mechanism that interconnects the security enclosure and a structural mount of the security apparatus.

As shown in FIG. 4, the security housing 50 preferably has a hole 53 that is sized to receive a portion of the swivel mechanism 26. Both the security housing 50 and the tray 46 are preferably made of steel. The external dimensions of one embodiment of the security housing 50 are 13.5 inches long by 12 inches wide by 1.75 inches tall.

When connected together, the tray 46 and the security housing 50 define a fastening volume 54 (see FIG. 4), wherein at least one fastener 58 for securing the projector 14 is securely housed and shielded from access by a thief. Because the tray 46 is slidably received by the security housing 50, the security tray 46 can be easily moved with respect to the security housing 50. When the tray 46 is disengaged from the security housing 50, the fasteners 58 are accessible so that the projector 14 can be removed for service or for replacement. The external dimensions of one embodiment of the security tray 46 are 13.3 inches long by 11.8 inches wide by 1.55 inches tall.

FIGS. 1-3, 6, and 9 show that in various embodiments a lock 62 is provided, preferably on the forward facing side of the security enclosure 22, to lock the tray 46 against movement relative to the security housing 50. The lock 62 can be any suitable lock, but is preferably a high-security, pick-resistant lock. Of course, locks being even more secure can be provided at additional cost within the scope of the claimed invention. A cylindrical key lock is a conventional lock that could be used in connection with the security apparatus 10. While the lock 62 is shown on the forward facing side of the security enclosure 22, it could be located in other suitable locations, so long as it securely connects the security tray 46 to the security housing 50.

The security tray 46 provides for the secure and versatile attachment of the projector 14 (or other portable devices or equipment) to the security enclosure 22. As illustrated best in FIGS. 3-5, the projector 14 is connected primarily externally to the security enclosure 22. The tray 46 preferably has an equipment mounting surface 66, a fastening volume surface 70, and a plurality of attachment holes 74. Each of the attachment holes 74, collectively referred to herein as a hole pattern grid, extends from the equipment mounting surface 66 of the security tray 46 to the fastening volume surface 70 of the security tray 46. The attachment holes 74 are configured to receive the fasteners 58 that are sized to engage the projector 14. By providing the hole pattern grid, the security enclosure 22 is made compatible with the wide variety of devices that the user may want to secure to the structure 30 using the security apparatus 10. Unlike prior designs, the hole pattern grid of the tray 46 advantageously enables interconnection of the security apparatus 10 and the projector 14 or device without the need for a wide variety of adapters.

The projector 14 can be attached to the tray 46 by direct bolting, by using one or more flexible footings 78, or by any other suitable method. In the direct bolting method, the projector 14 is turned upside-down to expose a set of footings provided by the manufacturer of the projector 14 or other device that are disposed on the bottom side of the projector 14 or device. The footings of the projector 14 are either removed or adjusted so that they are substantially flush with the bottom surface of the projector 14. Then the security tray 46 is placed on the bottom of the projector 14. The hole pattern grid of the security tray 46 and the projector 14 are lined up so that a plurality of internally threaded mounting holes or nuts of the projector 14 provided by the projector manufacturer can be seen through the attachment holes 74 of the tray 46. For some projectors 14, one or more additional attachment holes can be formed in the tray 46 as may be necessary to provide access to one or more of the mounting holes or nuts on the projector 14 that are otherwise inaccessible via the attachments holes 74 of the hole pattern grid. An appropriately sized fastener 58, e.g., one that matches the internal threads of the mounting holes or nuts of the projector 14, is selected.

A length of plastic tube 77 may be provided to at least partially surround the fasteners 58 to shield the fasteners 58 in the small space between the projector 14 and the tray 46, where a thief could attempt to saw through or otherwise defeat the fastener. One type of plastic tube 77 that could be employed is known as split-loom. If a thief were able to insert a saw between the small space between the projector 14 and the tray 46, the split-loom further protects the projector 14 from theft by making it more difficult to saw through the fasteners 58. After the plastic tube 77 is selected and wrapped around the fastener, the tray 46 is attached to the projector 14 with the fasteners 58.

In one embodiment of the direct bolting method, the fasteners 58 comprise machine screws and washers that interconnect the projector 14 and the security tray 46. For example, a plurality of machine screw having about a six millimeter diameter and being about thirty-five millimeters long could be used. Alternatively, a plurality of machine screws having about an eight-thirty-seconds diameter and being about one and one-quarter inches long could be used. In some embodiments, a washer, such as a one-quarter inch inner diameter by one and one-quarter inch outer diameter washer, can be used to more securely retain the head of the machine screw in the fastening volume 54. As should be recognized, the size and shape of fasteners can vary widely as the security apparatus 10 is configured for use with a wide variety of devices that may have different sizes and that might require fasteners of different sizes and configurations.

In another attachment method, at least one flexible footing 78 is provided between the projector 14 and the equipment mounting surface 66 of the security tray 46. In this method, the projector 14 is turned upside down. Footings on the projector 14 that are provided by the manufacturer of the projector 14 or device that are disposed on the bottom surface of the projector 14 or device are removed or adjusted so as to be substantially flush with the bottom surface of the projector 14. A plurality of flexible footings 78 are placed proximate one or more edges of the bottom surface of the projector 14. The flexible footings 78 are trimmed with scissors to be appropriately sized for the projector 14 being mounted. The tray 46 is placed on the bottom of the projector 14 so that internally threaded mounting holes of the flexible footing 78 can be seen through the mounting holes 74 of the tray 46. The position of each of the flexible footings 78 is marked on the bottom surface of the projector 14. The area at the bottom surface of the projector 14 is then prepared.

For a painted metal projector housing, the bottom surface is prepared by treating it so as to remove the paint and to expose the bare metal of the bottom surface of the projector 14. For a projector 14 having a plastic housing, the bottom surface is lightly sanded and then cleaned. The flexible footings 78 are also cleaned. One cleaning method employs alcohol wipes. Any other suitable cleaning agent can also be used. Both the flexible footings 78 and the bottom surface, of the projector 14 are allowed to dry. Then, an appropriate amount of cyanoacrylate adhesive is placed on one of the flexible footings 78. The flexible footings 78 and the bottom surface of the projector 14 are then pressed together and the cyanoacrylate adhesive allowed to cure. This is repeated for each flexible footing 78.

Once the flexible footings 78 have been secured to the bottom surface of the projector 14, the tray 46 can be placed over flexible footings 78 once again. Then the tray 46 and the flexible footings 78 can be interconnected using the fasteners 58. The flexible footing 78 is described more fully in U.S. Pat. No. 6,193,207, incorporated by reference herein. In general, the flexible footings provide attachment of the projector 14 or device to the tray 46 when no mounting holes or nuts on the projector 14 are conveniently located.

As most clearly shown in FIG. 4, the portion of the fasteners 58 that is engaged by a wrench or the like to advance or withdraw the fastener 58 is housed completely within the fastening volume 54. As discussed above, the lock 62 locks the tray 46 against movement relative to the security housing 50. As a result, once the tray 46 and the security housing 50 are locked together, the fastening volume 54 is substantially secure and the fasteners 58 are inaccessible. Therefore, a thief is not able to physically get to the fasteners 58 without first defeating the lock 62. This provides a substantial degree of theft deterrent.

Figure 2A:
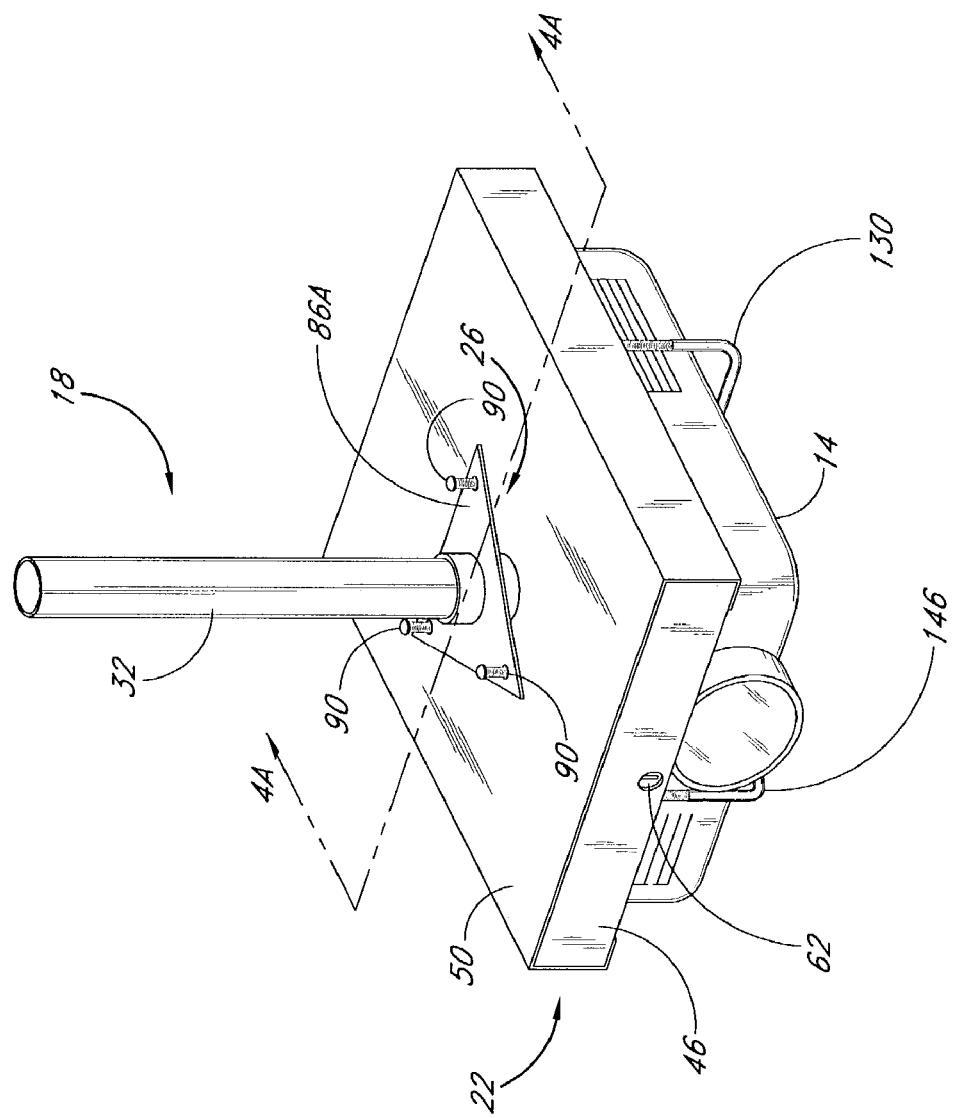
FIG. 2A is a perspective view of another variation of the security apparatus of FIG. 1.

With reference to FIGS. 4 and 5, the interconnection of the security enclosure 22 and the structural mount 18 will now be discussed in greater detail. As noted above, the hole 53 in the security housing 50 is configured to receive at least a portion of the swivel mechanism 26. In one embodiment, the swivel mechanism 26 comprises a pivot dome 82 that partially resides within the fastening volume 54, a pitch and roll plate 86, a plurality of adjustment members 90, and an interconnecting element 94. The pitch and roll plate 86 is shown as having a rectangular shape in many of the drawings. However, many other arrangements of the pitch and roll plate are also possible. For example, a triangular pitch and roll plate 86' is shown in FIG. 2A which employs three adjustment members 90.

The pivot dome 82 has a top portion 98, a bottom portion 102, and an external surface 106 that extends between the top portion 98 and the bottom portion 102. The perimeter of the top portion 98 is smaller than the size of the hole 53. The perimeter of the bottom portion 102 is greater than the size of the hole 53. Because the size of the hole 53 is less than the perimeter of the top portion 98 but greater than the perimeter of the bottom portion 102, the external surface 106 engages an edge of the hole 53 of the security housing 50. Accordingly, when the pivot dome 82 of the swivel mechanism 26 is placed partially within the fastening volume 54 and within the hole 53, and fixed vertically, the security enclosure 22 is also fixed vertically.

In one embodiment, the external surface 106 of the pivot dome 82 is a hemispherical surface. However, other shaped surfaces will also work, such as conical, elliptical, or parabolic shaped surfaces. In general, the perimeter of the hole 53 can be located on the external surface 106 of the pivot dome 82 in a variety of positions, which orients the security enclosure 22 in the pitch and in the roll directions.

In one embodiment, the swivel mechanism 26 is attached to the structural mount 18 by the interconnecting element 94 (See FIG. 4). The interconnecting element 94 includes, in one embodiment, a coupler 110, a threaded tube 114, and a plurality of lock nuts 118. The coupler 110 is an element having internal threads configured to mate with the external threads on the end 34 of the column 32. In one embodiment, the coupler 110 is configured to mate with a one and one-half inch inner diameter threaded hollow column. The coupler 110 also has internal threads configured to engage external threads located on the threaded tube 114. In one embodiment, the threaded tube 114 has a length of about one and three-quarters inches. A first locking nut 118a is provided on the threaded tube 114 between the coupler 110 and the pitch and roll plate 86. A second locking nut 118b is provided on the threaded tube 114 between the pitch and roll plate 86 and the top portion 98 of the pivot dome 82. A third locking nut 118c is provided on the threaded tube 114 between the top portion 98 of the pivot dome 82 and the fastening volume 54. In one embodiment, the locking nuts 118a-118c each are one and one-half inch locking nuts.

Arrangements other than that of FIG. 4 are also possible. FIGS. 1A and 4A illustrate another manner of interconnecting the swivel mechanism 26 and the structural mount 18. In this embodiment, the locking nut 118a is eliminated and the locking nut 118b is replaced with a rubber spacer 117. The rubber spacer 117 is located between the pitch and roll plate 86 and the top portion 98 of the pivot dome 82.

Advantageously, the locking nut 118c that secures the pivot dome 82 to the security housing 50 is located within the fastening volume 54. Thus, the locking nut 118c is also not accessible once the lock 62 locks the tray 46 to the security housing 50. As with the fasteners 58, this provides the advantage that a thief would not be able to easily remove the swivel mechanism 26 without first defeating the lock 62.

In one embodiment, the security apparatus 10 is provided with a security bar 130. The security bar 130 is configured to at least partially surround a portion of the projector 14 or other electronic device mounted on the security enclosure 22. FIG. 4 illustrates that the security bar 130 has a first engagement portion 132 that extends through the security tray 46 and into the fastening volume 54 wherein the first engagement portion 132 is engaged by a fastener 134, e.g., a nut. In some embodiments, the security bar completely surrounds the projector 14 and has a second engagement portion 136 that extends through the security tray 46 and into the fastening volume 54 wherein the second engagement portion 136 is engaged by a fastener 138, e.g., a nut.

Preferably, the security bar 130 includes a first adjustment portion 140 and a second portion 142 configured to engage the first adjustment portion 140. The engagement of the first adjustment portion 140 by the second portion 142 can be achieved by providing internal threads on the second portion 142 and external threads on the first adjustment portion 140. Preferably the threads are long enough to provide a range of adjustability that is large enough to accommodate most projectors 14 or other devices that can be mounted on the security enclosure 22. The horizontal length of the security bar 130 can be increased or decreased by relative rotational motion between the first portion 140 and the second portion 142 of the security bar 130. Thus the security bar 130 can be used with a wide variety of devices having different shapes and sizes.

In some embodiments, it may be desirable to provide a second security bar 146 that is similar to the first security bar 130 in that the security bar 146 is adjustable and is configured to at least partially surround the projector 14 or other device that is attached to the security enclosure 22. If two security bars are employed, they can be mounted on the security enclosure 22 in a generally perpendicular fashion, as in FIG. 1. Preferably, if two security bars are employed, they are mounted on the security enclosure 22 in a generally parallel fashion (as shown in FIG. 1A).

While the security bars 130, 146 provide a further measure of security for the projector 14 or other device, in some applications they may reduce the sleek appearance of the security apparatus 10. Accordingly, in some applications, it may be desirable to provide split loom that can encircle the security bars 130, 146. While provided mainly for its appearance, the split loom also can interfere with an attempt to saw through the security bars 130, 146.

Figure 6:
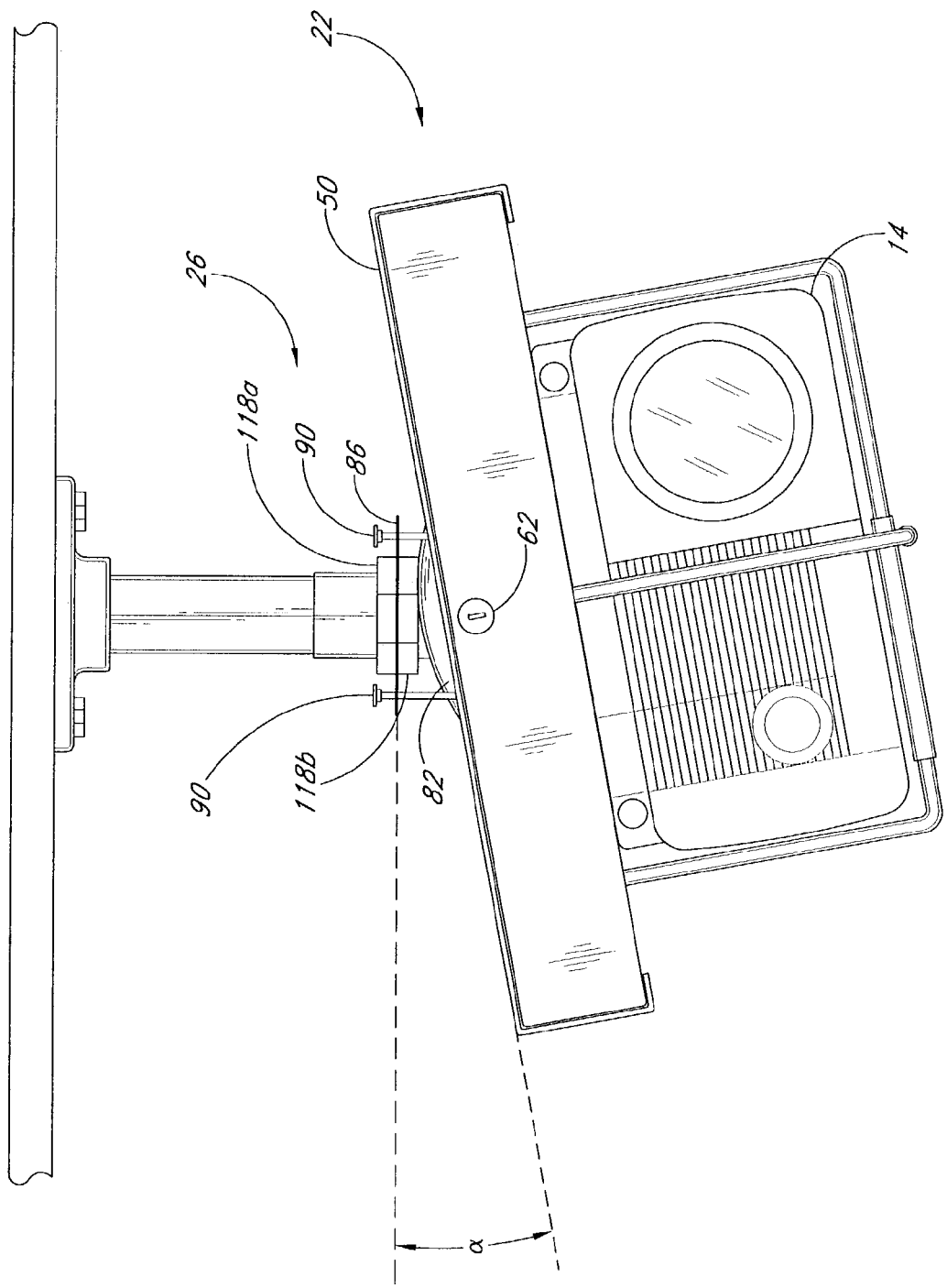
FIG. 6 is a front elevation view of the security enclosure that shows a roll adjustment of the security apparatus.
Figure 7:
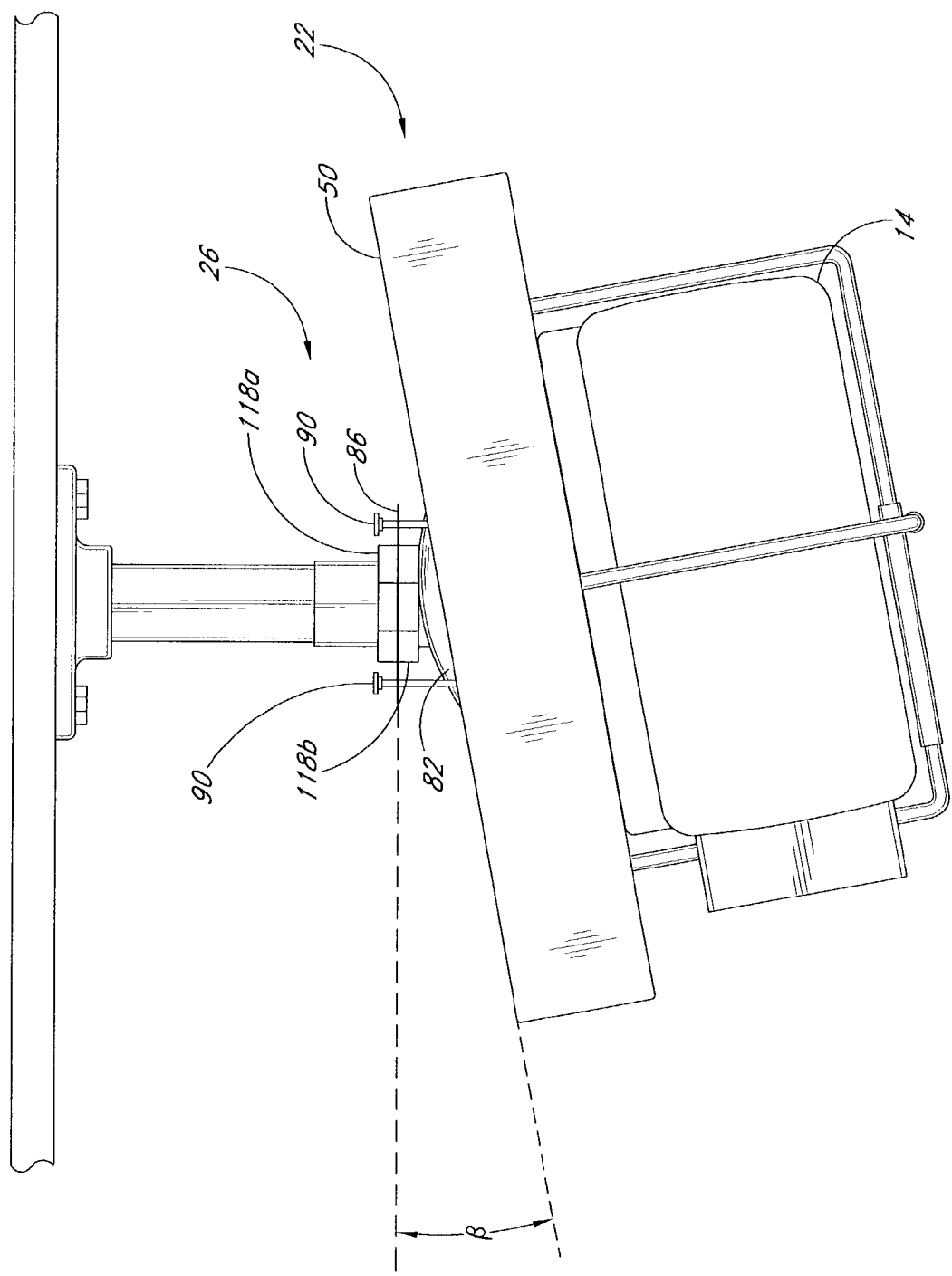
FIG. 7 is a side elevation view of the security enclosure that shows a pitch adjustment of the security apparatus.

FIGS. 6 and 7 illustrate the security enclosure 22 in different orientations relative to the structure 30. As mentioned above, the security housing 50 can be swiveled in different orientations by the swivel mechanism 26. This allows for adjustment and orientation of the security enclosure 22. For example, the security enclosure 22 can be rotated about a longitudinal axis that extends through the elongate element 32. The swivel mechanism provides 360 degrees of rotation of the security enclosure 22 with respect to the swivel mechanism 26. Once the rotation of the security enclosure 22 with respect to the swivel mechanism 26 has been selected, the pitch and roll orientation of the projector 14 can be selected.

The projector 14 can be oriented in the pitch and roll axes by positioning the security enclosure 22 as desired on the pivot dome 82. Adjustment about the pitch axis involves orienting the security enclosure 22 and the projector 14 about a transverse axis, e.g., an axis parallel to the upper surface of the enclosure 22 and perpendicular to the long axis thereof. The swivel mechanism 26 preferably allows a pitch adjustment of the security enclosure 22 of between about fifteen degrees above a horizontal plane and about fifteen degrees below a horizontal plane. Adjustment about the roll axis involves orienting the security enclosure 22 and the projector 14 about a longitudinal axis, e.g., an axis that is parallel to the long axis thereof. The swivel mechanism 26 preferably allows a roll adjustment of the security enclosure 22 of between about fifteen degrees above a horizontal plane and about fifteen degrees below a horizontal plane. The swivel mechanism 26 can also be constructed to provide a greater range of adjustment if desired.

When the security enclosure 22 is suitably positioned on the pivot dome 82, the plurality of adjustment members 90 then can be positioned so that the adjustment members 90 extend between the pitch and roll plate 86 and the top surface of the security housing 50. This prevents the security enclose 22 from moving once its position has been selected.

Alternatively, the security enclosure 22 can be oriented by simply selectively advancing or retracting one or more of the adjustment members 90 with respect to the pitch and roll plate 86. As the adjustment members 90 are advanced they ultimately contact the top surface of the security housing 50, which causes the security housing 50 to move on the pivot dome 82. As the security housing 50 moves on the pivot dome 82, the pitch angle $\alpha$ and the roll angle $\beta$ are altered (See FIGS. 6 and 7).

In one embodiment, the adjustment members 90 are threaded bolts that extend through threaded holes in the pitch and roll plate 86. In the illustrated embodiment, four adjustment members 90 are shown. However, in other embodiments, fewer adjustment members 90 can be used. In a particular embodiment, three adjustment members 90 are used. Of course more adjustment members could also be used, and the adjustment members 90 need not be threaded bolts. Examples of other types of adjustment members 90 include a ball joint clamp, a rod clamp, a cable, and a rope.

Another advantage of the security apparatus 10 is that the security enclosure 22 and the projector 14 attached thereto can be positioned at a selected orientation without unlocking the lock 62. This enhances the security of the security apparatus 10 by reducing the number of times the security apparatus 10 must be opened and by reducing the number of individuals who need to have access to the fastening volume 54.

Figure 8:
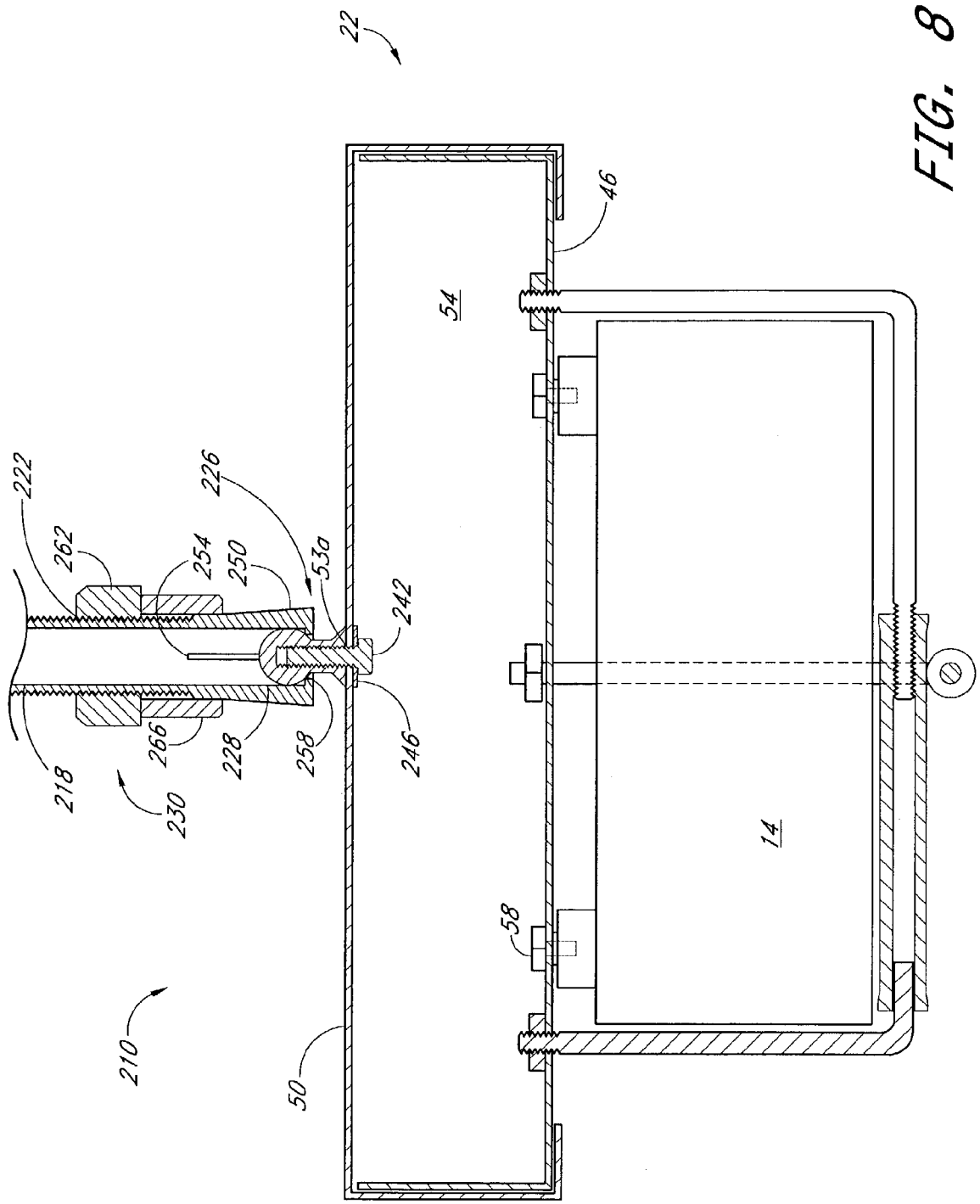
FIG. 8 is a is a cross-section elevation view similar to that of FIG. 4, showing one embodiment of a ball joint positioned between the security enclosure and a structural mount of the security apparatus.
Figure 9:
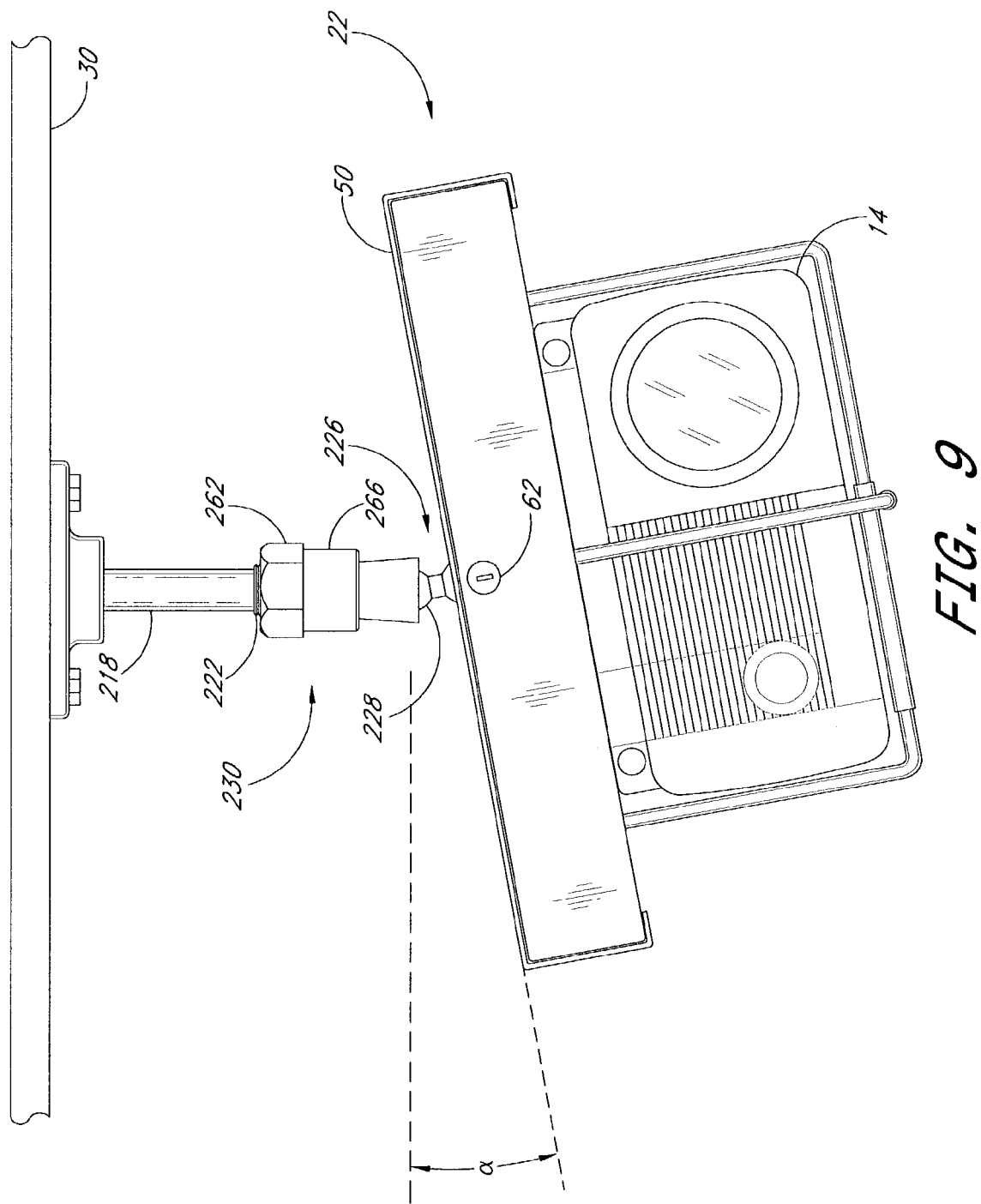
FIG. 9 is a front elevation view of the security apparatus of FIG. 8 that shows a roll adjustment of the security apparatus of FIG. 8.

FIGS. 8-9 show another embodiment of a security apparatus 210. The security apparatus 210 is similar to the security apparatus 10, except as set forth below. The security apparatus 210 includes a structural mount 218 and a ball joint 226. In some embodiments, the structural mount 218 is connected to the ball joint 226 and is connected to the structure 30. In some embodiments, a portion of the structural mount 218 forms a part of the ball joint 226. The structural mount 218 preferably has threads 222 which facilitate tightening and loosening of the ball joint 226.

The ball joint 226 comprises a ball 228, a ball enclosure, e.g. a collet (discussed below), and a clamping mechanism 230. The ball 228 is coupled with the security enclosure 22 in a secure manner. In the illustrated embodiment, a hole 53A is formed in the security housing 50. A bolt 242 extends through the hole 53A. A washer 246 preferably is placed between the bolt 242 and the security housing 50. The bolt 242 is advanced into an appropriately sized and threaded hole formed in the ball 228. As discussed above, the security tray 46 is slidably received by the security housing 50 in some embodiments. The tray 46 and the housing 50 define a substantially secure fastening volume 54 (see FIG. 8), wherein at least one fastener 58 for attaching the projector 14 and at least a portion of the ball joint 226 (e.g., a portion of the bolt 242) are housed securely and are shielded from access by a thief. The fastening 54 volume is made more secure by the lock 62 (see FIG. 9) in the illustrated embodiment.

One form of a ball enclosure is a collet 250, illustrated in FIG. 8. In the illustrated embodiment, the collet 250 forms a part of the structural mount 218. In another embodiment, the collet 250 is a separate component which is connected to or coupled with the structural mount 218 in a suitable manner. In some embodiments, the collet 250 is arranged as an expandable sleeve that receives the ball 228. In one arrangement, the collet 250 includes a slot 254 that extends from the end where the ball 228 is located (See FIG. 8). In one embodiment, two diametrically opposed slots 254 are provided. The slots 254 permit opposing sides of the collet 250 to move perpendicular to the longitudinal axis of the structural mount 218. The movement of the opposing sides of the collet 250 allows the clearance between the inside surfaces of the collet 250 to change, as needed for adjustment of the ball joint 226, as discussed below.

The lower end of the collet 250 preferably is arranged to retain the ball 228 when the ball joint 226 is loosened. In the illustrated embodiment, the collet 250 includes a retaining lip 258 extending inward from the inside surface of the collet 250. The retaining lip 258 constricts the size of the opening of the collet 250 to a size smaller than the diameter of the ball 228. Thus, the retaining lip 258 retains the ball 228 within the collet 250 when the ball joint 226 is loosened.

The clamping mechanism 230 of the ball joint 226 is configured to apply force to the ball 228 in a manner that selectively immobilizes the ball 228. In the illustrated embodiment, the clamping mechanism 230 includes a nut 262 that is advanced onto the structural mount 218 and a ring 266 positioned between the nut 262 and the collet 250. The ring 266 has an inner diameter that is larger than the outer diameter of the end of the collet 250 that is farthest from the ball 228. The inner diameter of the ring 266 is smaller than the outer diameter of the end of the collet 250 where the ball 228 is located. While the collet 250 has been described as conical and the ring 266 as cylindrical, other embodiments are also possible, e.g., both the collet 250 and the ring 266 could be conical.

The nut 258 and the ring 266 are configured so that the lower edge of the nut 258 engages the upper side of the ring 266. Advancement of the nut 262 on the structural mount 218 causes the ring 266 to be advanced on the collet 250. As the nut 262 is advanced, the ring 266 eventually engages the outer surface of the collet 250. The slots 254 allow the collet 250 to contract under the inward pressure applied by the ring 266. As the inner surface of the collet 250 engages the ball 228, ever-greater pressure is applied to the ball 228. Eventually, the pressure applied to the ball 228 is sufficient to immobilize the ball 228 so that the security enclosure 22 will not move with respect to the structure 30.

The clamping of the ball joint 226 advantageously permits positioning of the security enclosure 22 with respect to the structure 30. For example, the security enclosure 22 can be rotated about a longitudinal axis that extends through the structural mount 218. The ball joint 226 provides 360 degrees of rotation of the security enclosure 22 with respect to the structure 30. Once the rotational position of the security enclosure 22 with respect to the structure 30 has been selected, the pitch and roll orientation of the projector 14 can be selected.

The projector 14 can be oriented in the pitch and roll axes by rotating the ball 228 with respect to the collet 250. Adjustment about the pitch axis involves orienting the security enclosure 22 and the projector 14 about a transverse axis, e.g., an axis parallel to the upper surface of the enclosure 22 and perpendicular to the long axis thereof. The ball joint 226 preferably allows a pitch adjustment of the security enclosure 22 of between about fifteen degrees above a horizontal plane and about fifteen degrees below a horizontal plane. Adjustment about the roll axis involves orienting the security enclosure 22 and the projector 14 about a longitudinal axis, e.g., an axis that is parallel to the long axis thereof. Adjustment through a roll angle of $\alpha$ is illustrated in FIG. 9. The ball joint 226 preferably allows a roll adjustment of the security enclosure 22 of between about fifteen degrees above a horizontal plane and about fifteen degrees below a horizontal plane. The ball joint 226 can also be constructed to provide a greater range of adjustment if desired. Also, the ball joint 226 advantageously permits adjustment about axes other than the pitch and the roll axes, as will be understood by one skilled in the art.

When the security enclosure 22 is suitably positioned by the ball joint 226, the nut 262 is advanced toward the collet 250. As discussed above, the nut 262 engages a surface of the ring 266 and advancement of the nut 262 causes the ring 266 to be advanced. Eventually, advancement of the ring 266 causes pressure on the ball 228 to increase to a point where the security enclosure 22 is immobilized. This prevents the security enclose 22 from moving once its position has been selected by the ball joint 226.

Although the invention has been disclosed in the context of certain embodiments and examples, it will be understood by those skilled in the art that the invention extends beyond the specifically disclosed embodiments to other alternative embodiments and/or uses and obvious modifications and equivalents thereof. Accordingly, the invention is not intended to be limited by the specific disclosed embodiments.

What is claimed is:

1. A security apparatus that connects an electronic device to a structure, the security apparatus comprising:
   a structural mount configured to extend from the structure;
   a security enclosure having a tray that is configured to engage a variety of electronic devices externally to the security enclosure and a security housing, wherein the security housing and the tray are adapted to be engaged, the tray and the security housing defining a substantially secure fastening volume wherein at least one fastener for attaching the electronic device to the security enclosure can be located; and
   a swivel mechanism configured to engage the security housing and to adjust the orientation of the security enclosure and the electronic device attached thereto with respect to the structure;
   wherein the swivel mechanism further comprises a substantially hemispherical surface, a pitch and roll member located external to the fastening volume, and a plurality of adjustment members extending through the pitch and roll member to contact the security enclosure.

2. The security apparatus of claim 1, wherein the pitch and roll member is a pitch and roll plate.

3. The security apparatus of claim 1, wherein the swivel mechanism is configured to orient the security enclosure and the electronic device attached thereto through a swivel range about a swivel axis, through a pitch range about a pitch axis, and through a roll range about a roll axis.

4. The security apparatus of claim 3, wherein the swivel range is about 360 degrees, the pitch range is about 30 degrees, and the roll range is about 30 degrees.

5. The security apparatus of claim 1, wherein the swivel mechanism comprises three adjustment members.

6. The security apparatus of claim 1, wherein the tray of the security enclosure further comprises a plurality of mounting holes adapted to receive one or more fasteners for connecting the electronic device to the security enclosure.

7. The security apparatus of claim 1, wherein the structural mount comprises a column and a plate, the plate mountable onto the structure.

8. The security apparatus of claim 1, wherein the structural mount comprises an adjustable length column.

9. The security apparatus of claim 8, further comprising, a shroud and a lock, the shroud and lock configured limit access to an adjustable length column.

10. The security apparatus of claim 1, wherein the security housing is configured to slidably receive the tray.

11. The security apparatus of claim 1, further comprising a lock that selectively locks the tray to the security housing.

12. The security apparatus of claim 1, wherein the swivel mechanism is at least partially located within the fastening volume.

13. A security apparatus that connects a device to a structure, the security apparatus comprising:
a security enclosure having a security housing and a tray that is configured to engage a device, wherein the security housing is adapted to be engaged with the tray to form a substantially inaccessible fastening volume wherein at least one fastener for attaching the device to the security enclosure can be located; and
a swivel mechanism configured to engage the security housing and to adjust the orientation of the security enclosure in at least two degrees of freedom and the device attached thereto with respect to the structure;
wherein the swivel mechanism further comprises a substantially hemispherical surface having at least a portion thereof confined within the fastening volume, a pitch and roll member located external to the fastening volume, and a plurality of adjustment members extending through the pitch and roll member to contact the security enclosure.

14. The security apparatus of claim 13, wherein the device is an electronic device.

15. The security apparatus of claim 13, wherein the device is a projector.

* * * * *